United States Patent
Brandl et al.

(10) Patent No.: US 9,958,021 B2
(45) Date of Patent: May 1, 2018

(54) BRAKE PAD RETAINER FOR A DISC BRAKE

(71) Applicant: KNORR-BREMSE Systeme fuer Nutzfahrzeuge GmbH, Munich (DE)

(72) Inventors: Christian Brandl, Plattling (DE); Michael Hidringer, Hofkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days. days.

(21) Appl. No.: 14/993,223

(22) Filed: Jan. 12, 2016

(65) Prior Publication Data
US 2016/0131211 A1 May 12, 2016

Related U.S. Application Data

(63) Continuation of application No. PCT/EP2014/064495, filed on Jul. 8, 2014.

(30) Foreign Application Priority Data

Jul. 12, 2013 (DE) .......................... 10 2013 011 673

(51) Int. Cl.
*F16D 65/095* (2006.01)
*F16D 65/097* (2006.01)
(Continued)

(52) U.S. Cl.
CPC ....... *F16D 65/0978* (2013.01); *F16D 55/224* (2013.01); *F16D 55/225* (2013.01);
(Continued)

(58) Field of Classification Search
CPC .... F16D 65/097; F16D 65/974; F16D 65/977; F16D 65/978; F16D 65/0974; F16D 65/0977; F16D 65/978
See application file for complete search history.

(56) References Cited

U.S. PATENT DOCUMENTS 268,785 A * 12/1882 Duling .................... F16G 15/06
278/96
3,250,171 A * 5/1966 Taylor .................... F16B 19/02
174/150
(Continued)

FOREIGN PATENT DOCUMENTS

DE 94 22 342 U1 4/2000
DE 10 2005 044 091 A1 4/2007
(Continued)

OTHER PUBLICATIONS

International Search Report (PCT/ISA/210) issued in PCT Application No. PCT/EP2014/064495 dated Sep. 29, 2014 with English translation (five pages).
(Continued)

*Primary Examiner* — Bradley T King
(74) *Attorney, Agent, or Firm* — Crowell & Moring LLP

(57) ABSTRACT

A brake pad retainer is provided for a disc brake for a commercial vehicle. A pad retaining bracket is supported by pad retaining springs on both sides of a brake disc on a brake pad arranged in a brake caliper. The pad retaining bracket tensions a mounting opening of the brake caliper in the direction of the axis of the brake disc and is maintained at least on one side by a bolt-shaped securing element in a securing eye of the brake caliper. The brake pad retainer is designed such that the securing element is formed from an eccentric bolt having a shaft and at least one eccentric section which is positioned so that it is axially offset with respect the shaft.

8 Claims, 2 Drawing Sheets

(51) Int. Cl.
  *F16D 55/224*  (2006.01)
  *F16D 55/225*  (2006.01)
  *F16D 65/092*  (2006.01)
  *F16D 55/00*   (2006.01)

(52) U.S. Cl.
  CPC ....... *F16D 65/092* (2013.01); *F16D 65/0977* (2013.01); *F16D 2055/007* (2013.01); *F16D 2250/0084* (2013.01)

(56) References Cited

U.S. PATENT DOCUMENTS

| | | |
|---|---|---|
| 2008/0067016 A1 | 3/2008 | Pritz et al. |
| 2008/0110707 A1* | 5/2008 | Kromer ................ F16D 65/00 188/218 A |
| 2008/0289914 A1 | 11/2008 | Trimpe et al. |
| 2016/0061278 A1* | 3/2016 | Fischl ................ F16D 65/0974 188/73.38 |

FOREIGN PATENT DOCUMENTS

| | | |
|---|---|---|
| DE | 10 2005 049 057 A1 | 4/2007 |
| DE | 10 2007 051 153 B3 | 2/2009 |
| WO | WO 03/069180 A1 | 8/2003 |

OTHER PUBLICATIONS

German Office Action issued in counterpart German Application No. 10 2013 011 673.2 dated Feb. 17, 2014 (six pages).

German-language Written Opinion (PCT/ISA/237) issued in PCT Application No. PCT/EP2014/064495 dated Sep. 29, 2014 (four pages).

International Preliminary Report on Patentability (PCT/IB/326, PCT/IB/338 & PCT/IB/373) issued in PCT Application No. PCT/EP2014/064495 dated Jan. 21, 2016, including English translation of document C3 (German-language Written Opinion (PCT/ISA/237)) previously filed on Jan. 12, 2016 (seven pages).

\* cited by examiner

BRAKE PAD RETAINER FOR A DISC BRAKE

CROSS REFERENCE TO RELATED APPLICATIONS

This application is a continuation of PCT International Application No. PCT/EP2014/064495, filed Jul. 8, 2014, which claims priority under 35 U.S.C. § 119 from German Patent Application No. 10 2013 011 673.2, filed Jul. 12, 2013, the entire disclosures of which are herein expressly incorporated by reference.

BACKGROUND AND SUMMARY OF THE INVENTION

DE 94 22 342 U1 discloses a brake pad mounting which has proven itself, in particular, even under the often rough operating conditions, to which disc brakes are subjected in commercial vehicles.

In order to secure the position of the two brake pads, the latter are provided in each case with a pad mounting spring, which pad mounting springs are fastened to the respective brake pad in the upper edge region which faces an assembly opening of the brake caliper.

The brake pads are pressed under prestress into the pad shaft of a stationary brake carrier or the brake caliper by a pad mounting bracket which extends transversely with respect thereto, that is to say in the axial direction of the brake disc, and is supported on the pad mounting springs. Here, the pad mounting bracket is fixed in two regions of the brake caliper which lie opposite one another and delimit the assembly opening.

The mounting of the brake pads under spring prestress serves both for tolerance compensation and for reducing or preventing the generation of rattling noise, as would otherwise occur during driving operation of the vehicle.

In order to assemble and dismantle the pad mounting bracket using simple means, it is plugged on one side into a pocket-shaped receptacle of the brake caliper and is fastened on the other side to the brake caliper by way of a securing bolt, a washer and a split pin. The securing bolt which is supported on the pad mounting bracket is guided by way of a fastening socket which is formed integrally on the brake caliper and passes through a window opening of the pad mounting bracket.

The multiplicity of necessary individual parts, by way of which the pad mounting bracket is fastened to the brake caliper, is possible only with relatively great outlay on manufacturing and assembly, which leads to correspondingly high costs and opposes the constant requirement for cost optimization.

This likewise applies to another known way of fastening the pad mounting bracket, in which the latter is screwed to the brake caliper. To this end, a threaded bore has to be made in the brake caliper, which can naturally be brought about only in a relatively complicated manner.

Moreover, there is in principle the risk that the fastening element, specifically the split pin, becomes detached and is lost, in particular, during driving operation, just like the securing bolt which is then no longer secured, with the result that the pad mounting bracket can no longer fulfill its function, with the consequence of a failure of the disc brake.

The invention is based on the object of developing a brake pad mounting of the generic type in such a way that it can be manufactured and assembled in a more simple and less expensive manner.

This and other objects are achieved by a brake pad mounting of a disc brake for a commercial vehicle, having a pad mounting bracket which is supported on pad mounting springs of brake pads which are arranged on both sides of a brake disc in a brake caliper. The pad mounting bracket bridges an assembly opening of the brake caliper in the axial direction of the brake disc and is held in a fastening socket of the brake caliper at least on one side by a bolt-shaped securing element. The securing element is formed from an eccentric bolt, having a shank and at least one eccentric section which is positioned offset axially with respect to the shank.

As a result of this structural configuration of the securing element, the use of further measures, in particular a split pin, can in principle be dispensed with, since the securing against displacement is then taken over by integrally formed stops of the securing element.

This results in a whole series of advantages. In particular, the assembly of the pad mounting bracket and its securing are simplified substantially and therefore become less expensive especially since machining of the securing element is not required, as is required if a split pin is used as a result of the introduction of a bore into the securing bolt.

Moreover, the functional reliability of the disc brake overall is improved, since a release of the securing element and therefore a release of the pad mounting bracket from its fastening position are practically ruled out as a result of the spring pressure of the pad mounting springs which acts on the pad mounting bracket and therefore on the securing element, even in the case of enduringly relatively pronounced, operation-induced vibrations of the commercial vehicle.

Since a disc brake is a safety-relevant component, the improvement in the operational reliability is given particular significance.

The securing element which is configured as an eccentric bolt according to the invention passes with a shank through the transverse bore of the fastening socket, whereas the eccentric sections which are arranged on the shank on both sides and are positioned offset axially with respect thereto enclose the fastening socket between them.

The greatest cross-sectional dimension between the shank and at least one eccentric section is not greater than the associated cross-sectional dimension of the transverse bore of the fastening socket, with the result that the eccentric bolt can be introduced until the eccentric section which is guided through emerges from the transverse bore.

The two end-side eccentric sections are oriented in such a way that they partially cover the two associated side faces toward the upper, free end region of the fastening socket. The eccentric bolt is pressed into said position by way of the pad mounting bracket, against which the eccentric sections bear on the upper side, preferably in a bead.

As mentioned, the pad mounting bracket is pressed against the eccentric sections by way of the pad mounting springs of the brake pads, on which the pad mounting bracket is supported, as a result of which the eccentric bolt is compulsorily rotated into a position, in which it is secured against loss.

Otherwise, the eccentric bolt, on the one eccentric section of which a head is integrally formed for bearing against a side face of the pad mounting bracket, can be configured particularly simply as a cast or forged part.

Other objects, advantages and novel features of the present invention will become apparent from the following detailed description of one or more preferred embodiments when considered in conjunction with the accompanying drawings.

DETAILED DESCRIPTION OF THE DRAWINGS

As the securing element, the figures show an eccentric bolt 1 which has a shank 2 which is adjoined on both sides by, in each case, one eccentric section 3, which eccentric sections 3 are arranged offset axially with respect to the shank 2.

Figure 1:
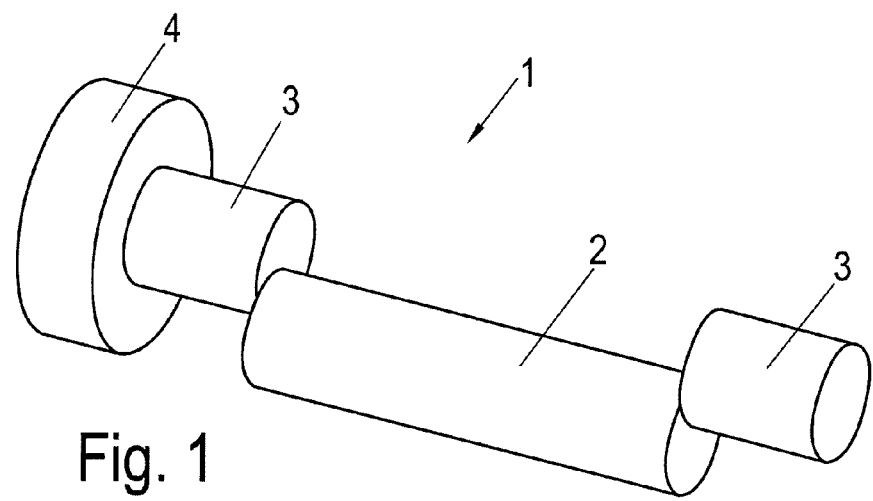
FIG. 1 is a detailed perspective view of the eccentric bolt according to an embodiment of the invention.
Figure 2:
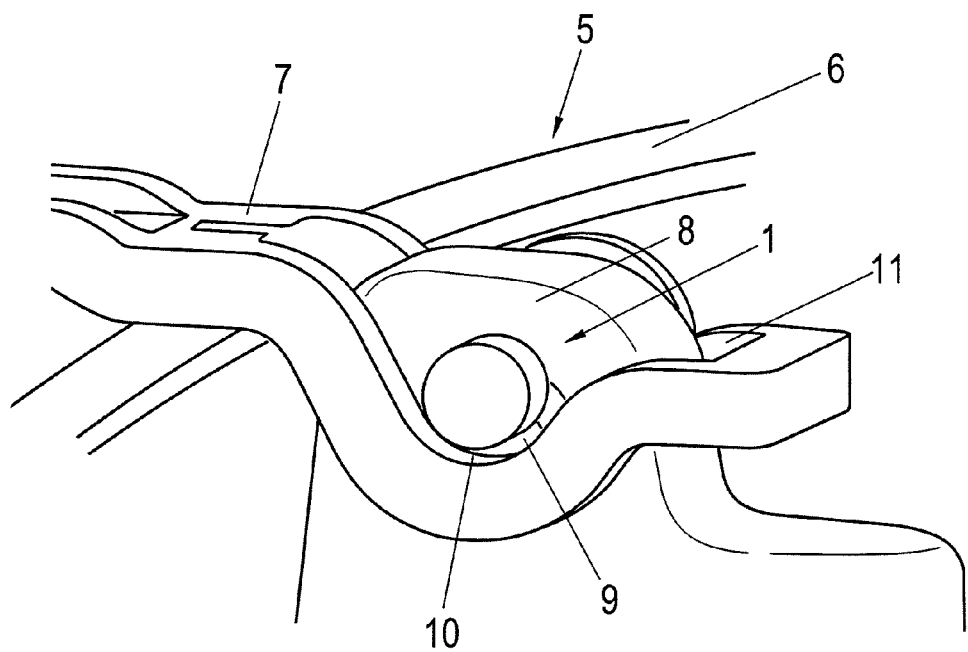
FIG. 2 shows a part detail of an assembled eccentric bolt in a perspective side view.
Figure 3:
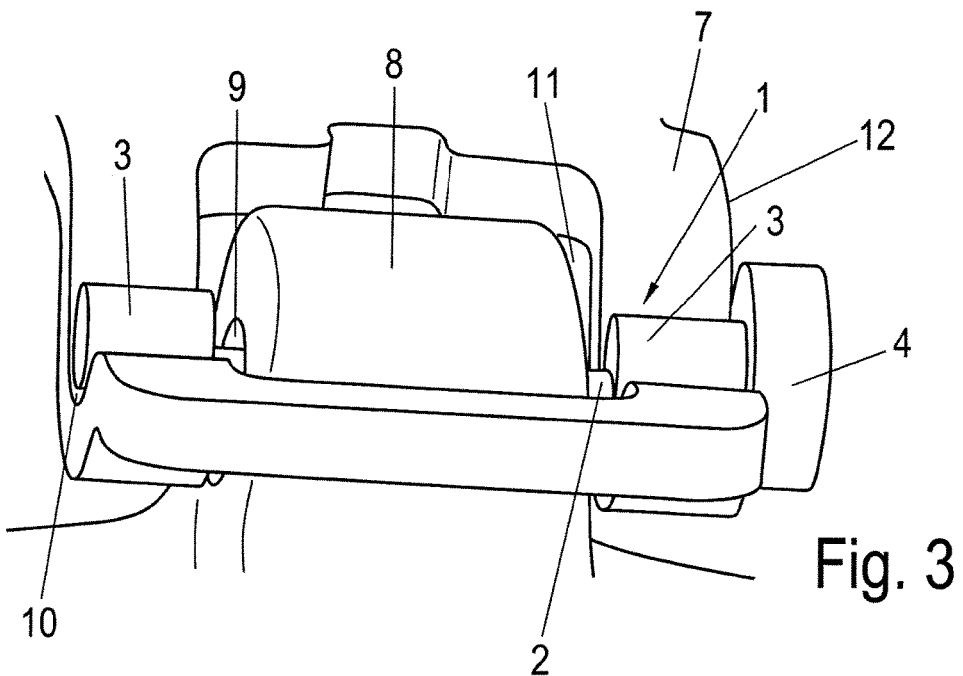
FIG. 3 shows the assembled eccentric bolt in a part detail in a front view.
Figure 4:
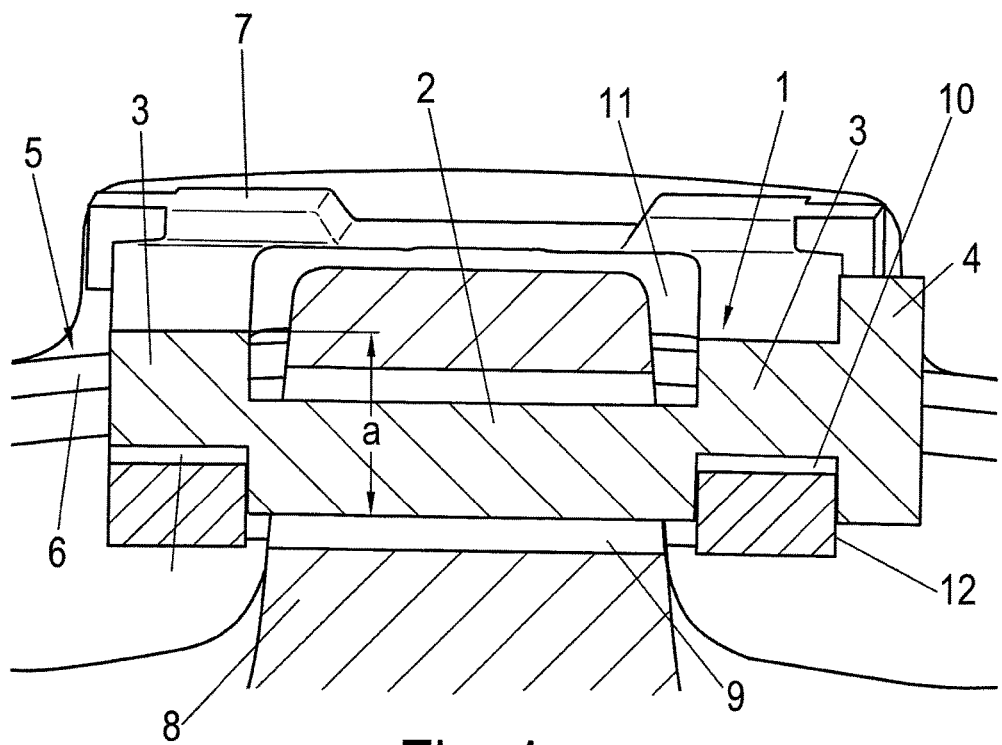
FIG. 4 shows the assembled eccentric bolt in a sectional illustration.

Moreover, a head 4 is connected on an eccentric section 3, which head 4, as can be seen in FIGS. 3 and 4, bears as a stop against a side face 12 of the pad mounting bracket 7.

It can be seen, furthermore, that the pad mounting bracket 7 has a window opening 11 through which a fastening socket 8 of the brake caliper passes through. The fastening socket 8 has a transverse bore 9 through which the eccentric bolt 1 is guided.

The eccentric sections 3 are held in a bead 10 of the pad mounting bracket 7, while the shank 2 bears against the upper side of the transverse bore 9 in the functional position. Their diameter corresponds to the maximum spacing "a" of the two outer sides of the shank 2 and the eccentric section 3 which is introduced first of all into the transverse bore 9 during assembly. The eccentric bolt 1 can therefore be pushed in without problems.

The pad mounting bracket 7 is supported on a pad mounting spring 6 of a brake pad 5, the pad mounting spring 6 which is configured as a leaf spring being under prestress.

By way of the spring pressure, the pad mounting bracket 7 is pressed with the region of its bead 10 against the eccentric sections 3, and the shank 2 is pressed against the upper side of the transverse bore 9 as viewed in the pressing direction of the pad mounting spring 6.

Automatic pressing of the shank 2 onto the reveal of the transverse bore 9 therefore takes place, the length of which shank 2 corresponds substantially to the length of said transverse bore 9, an automatic rotation of the eccentric bolt 1 into a secured position likewise taking place.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad mount of a disc brake for a commercial vehicle, comprising:
   a pad mounting bracket supportable on pad mounting springs of brake pads arranged on both sides of a brake disc in a brake caliper of the disc brake, wherein the pad mounting bracket bridges an assembly opening of the brake caliper in an axial direction of the brake disc,
   a bolt-shaped securing element that extends through a single transverse bore in a fastening socket of the brake caliper to hold the pad mounting bracket at least on one side, wherein
   the bolt-shaped securing element comprises an eccentric bolt having a shank arranged in the single transverse bore, and at least one eccentric section positioned offset axially with respect to the shank,
   a largest dimension between outer faces of the shank and the eccentric section is less than a diameter of the transverse bore of the fastening socket, and
   the shank is pressed and automatically rotatable under spring pressure applied to the eccentric section via the pad mounting spring onto an upper inner surface of the transverse bore such that a longitudinal axis of the shank is below that of the eccentric section.

2. The brake pad mount according to claim 1, wherein a respective eccentric section is connected on each side of the shank, at least one respective eccentric section having a head on a side facing away from the shank.

3. The brake pad mount according to claim 1, wherein the length of the shank corresponds to a length of a transverse bore through the fastening socket.

4. The brake pad mount according to claim 2, wherein the head bears against a side face of the pad mounting bracket.

5. The brake pad mount according to claim 2, wherein the respective eccentric sections lay in respective beads of the pad mounting bracket.

6. The brake pad mount according to claim 2, wherein the respective eccentric sections cover associated edge regions of a transverse bore through the fastening socket.

7. A brake pad mount of a disc brake for a commercial vehicle, comprising:
   a caliper having an assembly opening through which brake pads are arranged on both sides of a brake disc, the caliper having a fastening socket through which a single transverse bore is arranged;
   a pad mounting bracket configured to be supported on pad mounting springs of the arranged brake pads, the pad mounting bracket being configured to bridge the assembly opening in an axial direction of the brake disc, the pad mounting bracket having an opening at one end through which the fastening socket of the brake caliper extends;
   a bolt-shaped securing element configured to extend through the single transverse bore of the fastening socket in order to hold the pad mounting bracket, the securing element comprising an eccentric bolt having a shank and at least one eccentric section positioned offset axially with respect to the shank at one end of the shank, wherein
   a largest dimension between outer faces of the shank and the eccentric section is less than a diameter of the transverse bore of the fastening socket, and
   the shank is pressed and automatically rotatable under spring pressure applied to the eccentric section via the pad mounting spring onto an upper inner surface of the transverse bore such that a longitudinal axis of the shank is below that of the eccentric section.

8. The brake pad mount according to claim 7, wherein the securing element comprises a second eccentric section connected to an opposite end of the shank and being position offset axially with respect to the shank.

* * * * *